Oct. 10, 1939.  J. BUGATTI  2,175,516
SUSPENSION DEVICE
Filed Nov. 26, 1937   2 Sheets-Sheet 1
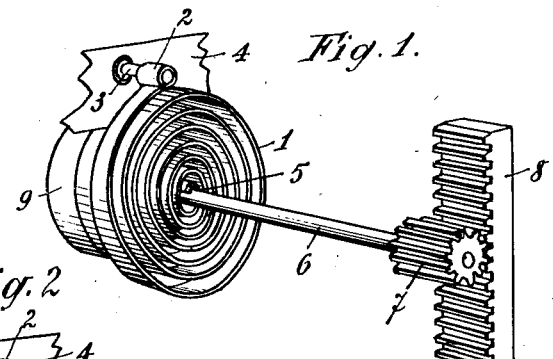
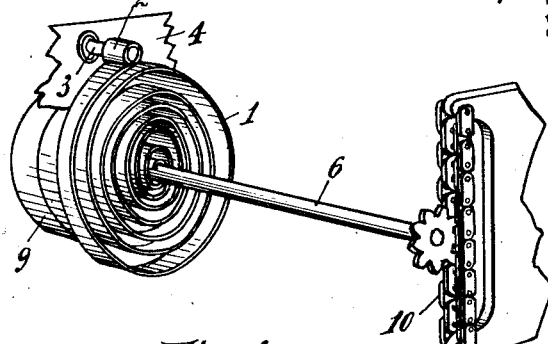
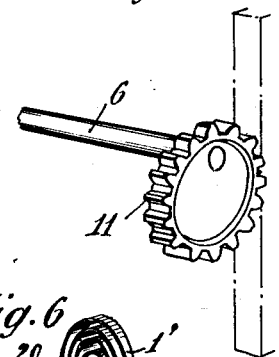
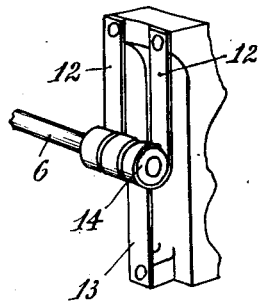
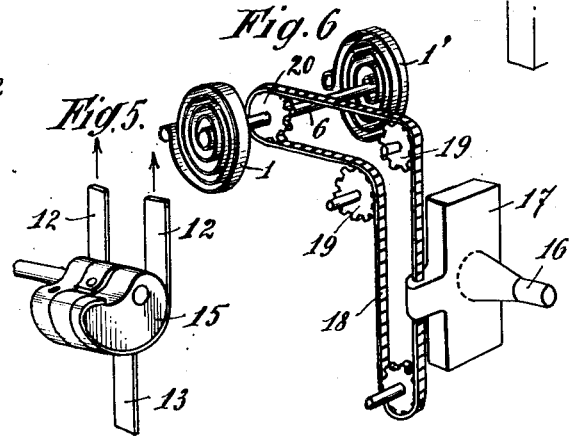
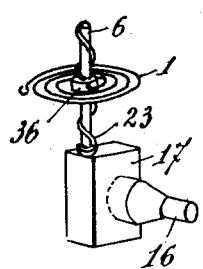
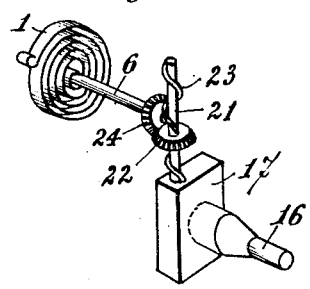
Inventor:
Jean Bugatti
By Mauro & Lewis
Attorneys Oct. 10, 1939.  J. BUGATTI  2,175,516

SUSPENSION DEVICE

Filed Nov. 26, 1937  2 Sheets-Sheet 2

Inventor:-
Jean Bugatti
By Mauro & Lewis,
Attorneys

Patented Oct. 10, 1939

2,175,516

UNITED STATES PATENT OFFICE 2,175,516

SUSPENSION DEVICE

Jean Bugatti, Molsheim, France

Application November 26, 1937, Serial No. 176,713
In France November 30, 1936

2 Claims. (Cl. 267—59)

For the suspension of the chassis of an automobile vehicle with respect to rolling elements thereof, it was customary, up to the present time, to make use of springs, and recently of torsion bars.

The springs that are more commonly used are leaf springs. In consequence of their structure, these springs amount to the combination of elastic elements into a friction shock absorber because, during the bending of the spring, the leaves rub against one another. An immediate drawback is that this shock absorbing action is not adjustable and that, employed in combination with the action of a distinct shock absorber, it creates, in the operation thereof, a disturbance which cannot be remedied to. Coil springs have not the disadvantage of this auto-friction effect, but they are more difficult to fit especially when they are to be long and flexible, and, as a matter of fact, they are employed only on light automobile vehicles and on railway vehicles, and, in the latter case, simultaneously with leaf springs if a satisfactory suspension is to be obtained; coil springs, when they have considerable length, must be guided and in this case the guiding members may cause supplemental friction.

Torsion bars can practically undergo but a greatly limited torsion and their ends must be strongly held in the movable piece which acts upon one of said ends and the fixed piece which maintains the other, respectively. Their use is rather delicate and risks of breaking are not excluded.

At the present time, the springs or torsion bars employed on automobiles are nearly always applied in combination with shock absorbers. The shock absorbers that are most usually employed are those including two parts movable angularly with respect to each other against an adjustable resistance. It should be noted that the amplitude of the angular displacement is but a small portion of a circumference and the existence of play corresponds to a substantial reduction of the useful displacement of the parts with respect to each other. Also, it should be noted that the angular velocity of the movable portion of the shock absorber is relatively low.

The object of the present invention is to provide an improved suspension device which is applicable in all circumstances in which two elements adapted to move with respect to each other with a rectilinear or curvilinear motion must be urged back elastically, and if possible without shock, toward a middle position. This suspension device, applicable for instance to machines or other apparatus which are not rigidly connected to their frame, is particularly well adapted for use in connection with vehicles, and especially automobile vehicles, and this particular application will be chiefly referred to in the following description.

According to the present invention, the suspension device essentially comprises a spiral spring, a coil spring, or an analogous spring (for instance a conical spring), that is to say a spring without auto-friction, secured at one of its ends to one of the elements between which this suspension device is mounted, and means capable of transforming into a rotary movement the substantially rectilinear relative movement of the second element with respect to the first, said means being interposed between the second element and the other end of the spring.

In the embodiment that is preferably chosen this suspension device is completed by a shock absorber. The shock absorber is, advantageously, a rotary shock absorber the movable part of which is acted upon, preferably directly, by the means for transforming the displacements above referred to. It is of interest to devise said means for transforming the displacements in such manner that to a relative displacement of average amplitude, that is to say of an amplitude that is not exceptional, between the two elements, there corresponds a rotation of nearly one complete turn or again of more than one turn, and even of several turns for the movable part of the shock absorber and for the end of the coil spring that is movable with respect to the other. As a rule, this shock absorber is an adjustable shock absorber. In this manner I obtain a highly sensitive suspension device the characteristics of which can be modified at will because the spring alone is subjected to oscillations which are practically not deadened and the deadening of these oscillations is nearly exclusively performed by the shock absorber, which can be adjusted as it is desired. As a consequence of the fact that the movable part of the shock absorber is caused to turn through an angle much greater and at a speed substantially higher than in shock absorbers mounted in the usual conditions, it is possible to obtain the desired effect at the cost of less intensive antagonistic stresses between the movable part and the fixed part, which is advantageous, particularly from the point of view of the time of service and of the simplicity, therefore of the weight and the cost of the shock absorbers.

Wide possibilities of adjustment and modification of the effect of the suspension within any desired limits result from the fact that, according to the invention, it is possible, on the one hand, to provide means for adjusting the fixation of the coil spring on the element to which it is connected, and on the other hand, to make in various shapes, which are more or less different from one another, and in this case also with the possibility of an adjustment, the means for transforming the relative movement between the second element and the other end of the spring. It is thus possible, in particular, to so arrange things that the curve representing the stress of the spring as a function of the relative displacement between the suspended element and the element acting as support is a straight line, or, on the contrary, a suitable curve.

Of course, there is no necessity to limit the invention to the use of a single spring or to the use of a single shock absorber. I may make use of various combinations of springs and particularly employ groups of springs some of which act in a direction and the others in the opposite direction.

In the embodiment of the invention that is preferably chosen in the case of a vehicle suspension, the coil spring or springs are secured at their outer ends to the body or chassis of the vehicle, and, at their inner ends, to a rotary shaft on which the shock absorber or the shock absorbers are mounted in tandem fashion with reference to the spring or springs. The shaft is acted upon by a rack, a chain, a pinion or the like controlled by a member connected to the wheel stub axle in its vertical displacements.

Other features of the present invention will result from the following detailed description of some specific embodiments thereof.

Preferred embodiments of the present invention will be hereinafter described, with reference to the accompanying drawings, given merely by way of example, and in which:

Fig. 1 is a perspective view of a first embodiment of the suspension device according to the present invention;

Fig. 2 is an analogous view corresponding to a modification;

Fig. 3 is a partial view showing a modification of one of the parts;

Figs. 4 and 5 are perspective views analogous to Fig. 3, corresponding to two other embodiments;

Figs. 6, 7 and 8 are perspective views of three other embodiments of the suspension device according to the invention;

Figure 9:
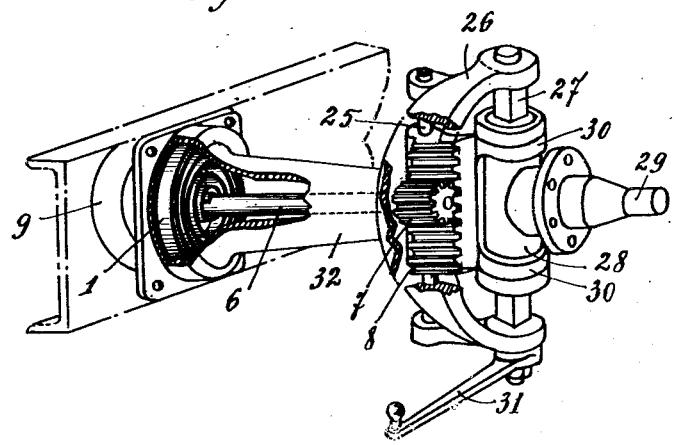
Fig. 9 is a perspective view, with parts cut away, of a practical construction of the suspension device the principle of which is shown by Fig. 1, as applied to a wheel adapted to be pivoted for steering purposes.

In the example of Fig. 1, the suspension device includes a spiral leaf spring 1 the outer end 2 of which is secured to an axis 3 carried by the suspended element, which is, for instance, the chassis 4 of a vehicle. The inner end 5 of spring 1 is connected to a shaft 6 carrying a pinion 7 in mesh with a rack 8. This rack 8 is connected to the second element, that is to say for instance to a wheel of the vehicle. On shaft 6 there is also mounted the rotary part of a shock absorber 9 which may be of any known type. Pinion 7 is chosen in such manner that to an average vertical displacement of the wheel there corresponds a rotation of shaft 6 which is a considerable portion of a complete circumference, or a whole circumference, or more than one circumference. It should be noted here that the angular velocity of shaft 6 is directly proportional to the velocity of vertical displacement of rack 8. In this case, the suspension will be referred to as having a linear characteristic. A suspension of the same kind is shown in Fig. 2, in which the rack is replaced by a chain 10.

In order to obtain a characteristic different from the linear characteristic, and which will be called curvilinear characteristic, I may make use of an eccentric pinion 11, or, more generally, of a toothed wheel in which the pitch line or curve is not a circle. With such a wheel, I may obtain, for instance, that the speed of rotation increases more quickly than the speed of vertical translation of the rack or of the chain.

In the embodiment of Fig. 4, shaft 6 is connected to flexible ribbons 12 and 13 which may, for instance, be metallic. When such ribbons, instead of winding around cylindrical pulleys such as 14, wind around cams such as 15 (Fig. 5), it is possible, through a suitable choice of the outline of the cams, to obtain a curvilinear characteristic having any desired shape.

In the example of Fig. 6, in which I have shown a wheel stub axle 16 integral with a sliding part 17, the device for transforming the rectilinear movement of said sliding part 17 into a rotation movement of shaft 6 includes a chain 18 passing on toothed wheels 19 and driving a toothed wheel 20 keyed upon this shaft 6. In the same figure (Fig. 6) I have further shown the utilization of two spiral leaf springs 1 and 1' arranged in opposite relation to each other. In this case also, it is possible to modify at will the characteristic of the suspension, for instance by replacing pinion 20 by an eccentric pinion such as pinion 11 of Fig. 3 or by any other suitable means.

In the embodiments of Figs. 7 and 8, the sliding member 17 which carries the stub axle 16 acts upon a shaft carrying a quick pitch thread 23. In the case of Fig. 7, this shaft is the shaft 6 on which is mounted the spiral spring 1, through the intermediate of a hub 36 provided with inner threads in mesh with the screw thread 23. In the case of Fig. 8, this shaft is an intermediate shaft 21 which extends through a pinion 22 with which it is connected through the quick pitch screw thread 23. Pinion 22 acts upon a pinion 24 keyed on shaft 6.

Of course, it is possible, according to the present invention, to combine in any suitable manner the various embodiments described with reference to Figs. 1 to 8.

Figure 10:
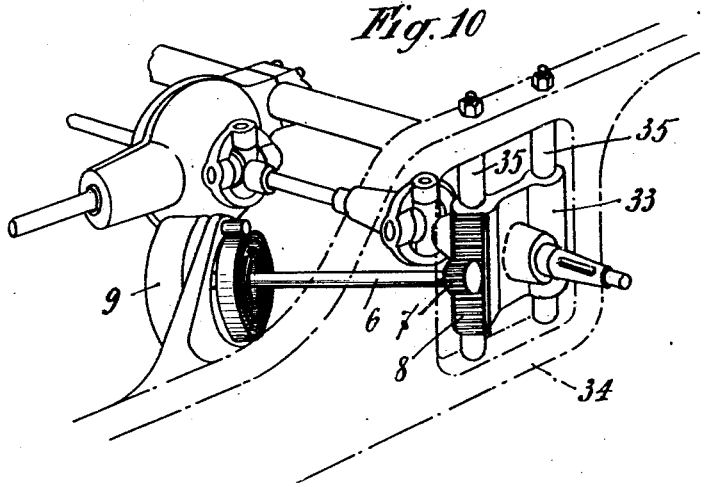
Fig. 10 is a perspective view analogous to Fig. 9 corresponding to a wheel which has no steering function.

In order better to illustrate the invention, I will now describe the application thereof to an automobile suspension, with reference to Figs. 9 and 10.

In the case of Fig. 9, the rack 8 is guided by a vertical spindle 25 which is rigid with a fork-shaped member 26 carried by the axle or its equivalent. In this fork shaped member 26, there is pivotally mounted an axis of square section 27, on which a sleeve 28 can slide longitudinally, but cannot rotate, said sleeve 28 carrying the wheel stub axle 29. This sleeve 28 can itself turn inside collars 30 rigid with rack 8. The movements which produce steering displacements of stub axle 29 and collar 28 are controlled, through the intermediate of the square axis 27 above referred to, by the usual lever 31. The transmission shaft 6, as well as the coil spring 1, are housed inside a case 32.

In the embodiment of Fig. 10, which corresponds to the suspension of a driving wheel which has no steering function, rack 8 is integral with a sliding piece 33, guided in an aperture of chassis 34 by spindles 35. This figure also shows spring 1 and shock absorber 9. Of course, a casing may be employed for protecting spring 1, transmission shaft 6, and eventually shock absorber 9.

In a general manner, while I have, in the above description, disclosed what I deem to be practical and efficient embodiments of the present invention, it should be well understood that I do not wish to be limited thereto as there might be changes made in the arrangement, disposition, and form of the parts without departing from the principle of the present invention as comprehended within the scope of the appended claims.

What I claim is:

1. The combination of a vehicle body with an independently sprung wheel support moving on a substantially straight line relative to the body, said support having a rack rigid therewith; a spindle revolubly mounted on the vehicle body; a pinion fast on the spindle, positioned to mesh with the rack, the pinion being so dimensioned with respect to the rack as to rotate by at least 360 degrees, when the rack moves together with the independently sprung wheel support by a predetermined average amount with respect to the vehicle body; and a coiled spring element with non-contacting convolutions, having an end attached to the spindle and its other end attached to the vehicle body.

2. The combination of claim 1, further comprising means on the vehicle body for braking the rotary movement of the spindle relative thereto.

JEAN BUGATTI.